US010193966B2

(12) United States Patent
Labranche

(10) Patent No.: US 10,193,966 B2
(45) Date of Patent: Jan. 29, 2019

(54) METHOD FOR A USER TO ACCESS AT LEAST ONE COMMUNICATION SERVICE PROVIDED VIA A DATA CENTRE OF A CLOUD COMPUTING SYSTEM

(71) Applicant: Orange, Paris (FR)

(72) Inventor: Miguel Labranche, Bonneuil sur Marne (FR)

(73) Assignee: ORANGE, Paris (FR)

( * ) Notice: Subject to any disclaimer, the term of this patent is extended or adjusted under 35 U.S.C. 154(b) by 45 days.

(21) Appl. No.: 15/026,141

(22) PCT Filed: Sep. 25, 2014

(86) PCT No.: PCT/FR2014/052407
§ 371 (c)(1),
(2) Date: Mar. 30, 2016

(87) PCT Pub. No.: WO2015/044597
PCT Pub. Date: Apr. 2, 2015

(65) Prior Publication Data
US 2016/0226965 A1    Aug. 4, 2016

(30) Foreign Application Priority Data

Sep. 30, 2013   (FR) .................................... 13 59419

(51) Int. Cl.
*H04L 29/08* (2006.01)
*H04L 29/06* (2006.01)
(Continued)

(52) U.S. Cl.
CPC ...... *H04L 67/1021* (2013.01); *H04L 12/4641* (2013.01); *H04L 43/087* (2013.01);
(Continued)

(58) Field of Classification Search
None
See application file for complete search history.

(56) References Cited

U.S. PATENT DOCUMENTS

2011/0138048 A1*   6/2011   Dawson ................ G06F 9/4856
                                                     709/226
2012/0196601 A1*   8/2012   Lundqvist ......... H04L 29/12066
                                                     455/435.2

FOREIGN PATENT DOCUMENTS

WO        2011150968 A1    12/2011

OTHER PUBLICATIONS

International Search Report dated Jan. 5, 2015 for corresponding International Application No. PCT/FR2014/052407, filed Jan. 5, 2015.

(Continued)

*Primary Examiner* — Jeffrey R Swearingen
(74) *Attorney, Agent, or Firm* — David D. Brush; Westman, Champlin & Koehler, P.A.

(57) ABSTRACT

A method for a user to access a communication service via a first data center of a cloud computing system. The first data center is located in a first geographical area. The first data center performs acts of: following connection of a terminal of the user to a web portal for accessing the service, receiving a message containing location information of the terminal; determining a geographical position of the terminal from the received location information, and, if the geographical position corresponds to a second geographical area different from the first area: searching for a second data center, capable of providing the service within the second area; if such a second data center exists, transferring computing functions to the second data center that are suitable for providing the service to the user, in order to implement the service in the user terminal from the second data center.

12 Claims, 3 Drawing Sheets

(51) Int. Cl.
 *H04W 4/021* (2018.01)
 *H04L 12/46* (2006.01)
 *H04L 12/26* (2006.01)
(52) U.S. Cl.
 CPC .......... *H04L 63/0272* (2013.01); *H04L 67/02* (2013.01); *H04L 67/101* (2013.01); *H04L 67/16* (2013.01); *H04W 4/021* (2013.01)

(56) References Cited

OTHER PUBLICATIONS

English translation of the International Written Opinion dated Feb. 2, 2016 for corresponding International Application No. PCT/FR2014/052407, filed Jan. 5, 2015.
Demichelis et al., "IP Packet Delay Variation Metric for IP Performance Metrics (IPPM)" http://tools.ietf.org/html/rfc3393, 21 pages, Nov. 2002.

* cited by examiner

METHOD FOR A USER TO ACCESS AT LEAST ONE COMMUNICATION SERVICE PROVIDED VIA A DATA CENTRE OF A CLOUD COMPUTING SYSTEM

CROSS-REFERENCE TO RELATED APPLICATIONS

This Application is a Section 371 National Stage Application of International Application No. PCT/FR2014/052407, filed Sep. 25, 2014, the content of which is incorporated herein by reference in its entirety, and published as WO 2015/044597 on Apr. 2, 2015, not in English.

FIELD OF THE DISCLOSURE

The invention relates to the general field of telecommunications, and notably to what are called "cloud" data processing systems, also known as "cloud computing" systems.

More particularly, it concerns user access to at least one communication service provided via a data center of a cloud computing system.

BACKGROUND OF THE DISCLOSURE

According to the definition provided by the National Institute of Standards and Technology (NIST), cloud computing is a model enabling users to access, via a network, on demand and on a self-service basis, computing resources such as storage space, computing power, applications, software or services which are provided in a virtual and shared form.

According to NIST, there are three categories of service that can be offered via cloud computing: IaaS (infrastructure as a service), PaaS (platform as a service) and SaaS (software as a service). In particular, IaaS (infrastructure as a service) is the lowest level of service. It consists in offering access to a computing infrastructure which is virtualized, that is to say based on data centers (computing centers or data processing centers) composed of servers (also called "blades") on which virtual machines are installed.

IaaS is mainly intended for business clients whose applications are hosted in secure data centers managed by the cloud service provider (CSP), these data centers usually being accessible on the internet via a secure connection to the private network of the business. As a general rule, the business client manages its infrastructure and computing resources via a web portal, and can thus rapidly adapt its computing resources to its peaks of activity and to the development of new applications.

The cloud computing services provided by the same service provider (CSP) in a number of countries (or different regions or states of a large country) generally use one or more data centers for each country or region. As a general rule, a client who has subscribed to a service offer in a given country, France for example, has his client account and his access to the service managed by a data center located in this country (country of origin). If this client travels to another country (visited country), for example the United States of America, and wishes to access his cloud services from the visited country, he must connect via his communication terminal (PC, tablet, or smartphone) to the network of this country—that is to say, for local internet access—and transmit a request for access to the service, which will be routed to the data center in the country of origin, even if a data center providing the same service exists in the visited country.

Because of the distance between the client's place of connection for access to the service in the visited country and the location of the server (data center) providing the service in the country of origin, the connection and use of the service from the visited country may cause a significant loss of quality of service (QoS), in terms of jitter, response time, network congestion and the like, as well as a possible increase in cost due to the inter-operator network connection. This is aggravated if the requested services are real-time services, such as communication services of the voice, video, conference, instant messaging, or other type.

SUMMARY

In this context, therefore, there is a need for a technical solution enabling a user who is a client of a service in a country of origin and is traveling outside this country to be able to access the service to which he has subscribed, while limiting, notably, the degradation of quality of service and the additional cost due to the network access.

The present invention is intended, notably, to meet the aforesaid need by proposing, according to a first aspect, a method for a user to access at least one communication service provided via a first data center of a cloud computing system, the first data center being located in a first geographic area.

According to the invention, the method comprises the following steps, executed in the first data center:

A)—after a user's terminal has been connected to a web portal for accessing the service, a message providing information on the location of the terminal is received in the first data center;

B)—the geographic location of the terminal is determined on the basis of the received terminal location information, and if the geographic location of the terminal corresponds to a second geographic area, different from the first area, then:

D)—a search is made for a second data center of the cloud computing system capable of providing the service in the second area;

E)—if this second data center exists, the computing functionality adapted to provide the communication service to the user is transferred to the second data center, so that the communication service can be used in the user's terminal, based on the second data center.

Thus, as a result of the method of the invention, if a user who has subscribed to a cloud computing service is in a state of movement or "roaming", he can access his service in good quality conditions and at lower cost by benefiting from the transfer of the functionality capable of executing his service from a first data center to a second data center of the same service provider (CSP), this second data center being selected because of its proximity to the geographical location of the user's terminal.

In practice, in the context of the present invention, the expression "geographic area" corresponds to a territory and/or a country. Additionally, each geographic area is associated with at least one data center of the cloud computing system, thus forming a set of data centers interconnected by a communications network.

Thus, a cloud computing service provider offering services in a number of different countries or territories and using the present invention will enable his clients to benefit from their services in the best possible conditions, even if they are traveling outside the country in which they have subscribed to the service offer.

According to a particular characteristic of the invention, the aforementioned step D) of the method is preceded by a step C) of measuring the network performance between the first data center and the user's terminal, said step D) being executed only if the measured network performance is insufficient to meet a specified level of quality of service.

Thus, the execution of the transfer of functionality from a first data center to a second one closer to the user is dependent on the verification of the quality of service of the network between the first data center and the user's terminal. If the measured performance is acceptable, it is unnecessary to execute the transfer of functionality to provide the service from a data center closer to the user, and therefore savings are made, in particular, in terms of the network resources required for the transfer of functionality between the first and second data center, while also avoiding the delay in establishing the service due to the time required for this transfer of functionality.

According to a characteristic of the implementation of the invention, step C) of measuring the network performance includes the measurement of the jitter between the first data center and the terminal, and the measurement of metrics specific to the type of service requested by the user.

By measuring metrics specific to the type of service requested by the user it is possible to launch the transfer of functionality only if the quality of service for the requested type of service is found to be insufficient. This is because, evidently, the required network performance will vary between, for example, a videoconference service and a simple telephone service.

According to one embodiment of the invention, the computing functionality adapted to the provision of the service is implemented in a virtual machine hosted by a server in the first data center. In this embodiment, in step D), the transfer of the functionality from the first data center to the second data center corresponds to the sending, to a server of the second data center, of a copy of some or all of the execution code of this virtual machine and its execution context.

The virtualization technique used in the context of cloud computing thus facilitates the transfer of some or all of the application functionality from a virtual machine hosted by a server of a first data center to a server of a second data center.

According to other characteristics of embodiment of the method according to the invention:

In step E), the implementation of the service in the user's terminal comprises the sending of a message to the terminal, notifying a change of data center providing the service from the first to the second data center, and the sending by the terminal of a service access request to the second data center.

The cloud computing system is carried out by the same cloud service provider (CSP), a user terminal being connected, in each geographic area, to a packet network (IP network), such as the internet, via a different access network.

The aforementioned packet network is a virtual private network (VPN) built on top of the internet.

An access network, mentioned above, of a geographic area belongs to the group comprising, but not limited to, a private local network, a mobile network of a mobile telephone operator, a wireless network (for example, a WiFi network), or even an ADSL network provided by a telephone operator, and others.

Similarly, according to a second aspect, the present invention proposes a data center of a cloud computing system, for the execution of an method of access to a communication service, such as that briefly described above. According to the invention, this data center comprises:

a unit for receiving a location information message from a user terminal connected to a web portal for access to the service;

a unit for determining the geographic location of a user terminal on the basis of received location information;

a unit for identifying a second data center capable of providing a service requested by a user terminal located in a geographic area different from that in which the (first) data center is located;

a unit for transferring, to this second data center, the computing functionality adapted to provide the communication service to a user terminal located in a geographic area different from that of said data center, so that the communication service can be used in the terminal, based on the second data center.

In practice, this data center is composed of one or more servers, each hosting virtual machines on which the applications of the clients of the cloud computing system are executed.

According to a particular characteristic of a data center according to the invention, the identification unit for identifying a second data center comprises a communication module adapted to communicate on the packet network with a set of data centers of the cloud computing system, in order to determine in real time the state of activity of the set of these data centers.

Thus, according to the invention, a specific communications network is provided between the different data centers of the same cloud computing provider, allowing these centers to communicate with one another to inform one another of their state of activity and availability.

According to a third aspect, the present invention concerns a communication terminal for the execution of a method for access to a communication service, according to the invention, as described above, on which is executed a software application comprising:

a module for sending a location information message to a first data center after connection to a web portal for access to the communication service in question;

a module for receiving a message notifying a change of data center providing the service, from the first to a second data center;

a module for sending a request for access to the communication service to the second data center.

In practice, this software application executed on a communication terminal according to the invention can be used on the basis of executable code contained in a web page downloaded from a server providing the web portal for access to the communication services provided by the cloud computing system. In this case, the module for sending a location information message can obtain this information, for example, from a geolocation application which is native or pre-installed in the communication terminal (such as the GPS module of a smartphone).

According to a fourth aspect, the present invention concerns a cloud computing system for the implementation of a method according to the invention as described briefly above. This cloud computing system comprises a set of data centers according to the invention, distributed over a set of geographic areas and interconnected by a packet communications network, each area being associated with at least one data center.

The functional entities and the functional modules composing a data center and a communication terminal according to the invention, respectively, are implemented in an essentially software form, and therefore the present invention also proposes, according to a final aspect, a computer program (or package of software modules) stored on a data medium for executing of some or all of the steps of a method according to the invention for a user to access at least one communication service provided by a cloud computing system, when the program is executed by a processor, which may be a hardware processor such as a microprocessor of a communication terminal or a virtual processor such as a hypervisor of a virtual machine hosted by a server.

Additionally, this computer program according to the invention can use any programming language, and can comprises programs in the form of source code, object code, or a code intermediate between source and object code, such as a code in partially compiled form, or any other desirable form.

Consequently, the invention also proposes a computer-readable data recording medium comprising instructions of a computer program. This recording medium can be any entity or device capable of storing the program. For example, the medium can comprise a storage means such as a ROM (read-only memory), for example a CD-ROM (compact disk ROM) or a microelectronic circuit ROM, or a detachable recording means such as a USB (Universal Serial Bus) memory stick or a magnetic recording means such as a hard disk. On the other hand, provision may be made for a package of software modules according to the invention to be accessible by downloading via a network of the Internet type.

The advantages provided by a data center, a communication terminal, and a computer program, according to the invention, as briefly described above, are identical to, or contribute to, those mentioned above in relation to the method for accessing a cloud computing service according to the invention, and therefore will not be listed here.

BRIEF DESCRIPTION OF THE DRAWINGS

Other characteristics and advantages of the present invention will be apparent from the following detailed description, which refers to the attached drawings, in which.

DETAILED DESCRIPTION OF ILLUSTRATIVE EMBODIMENTS

Figure 1:
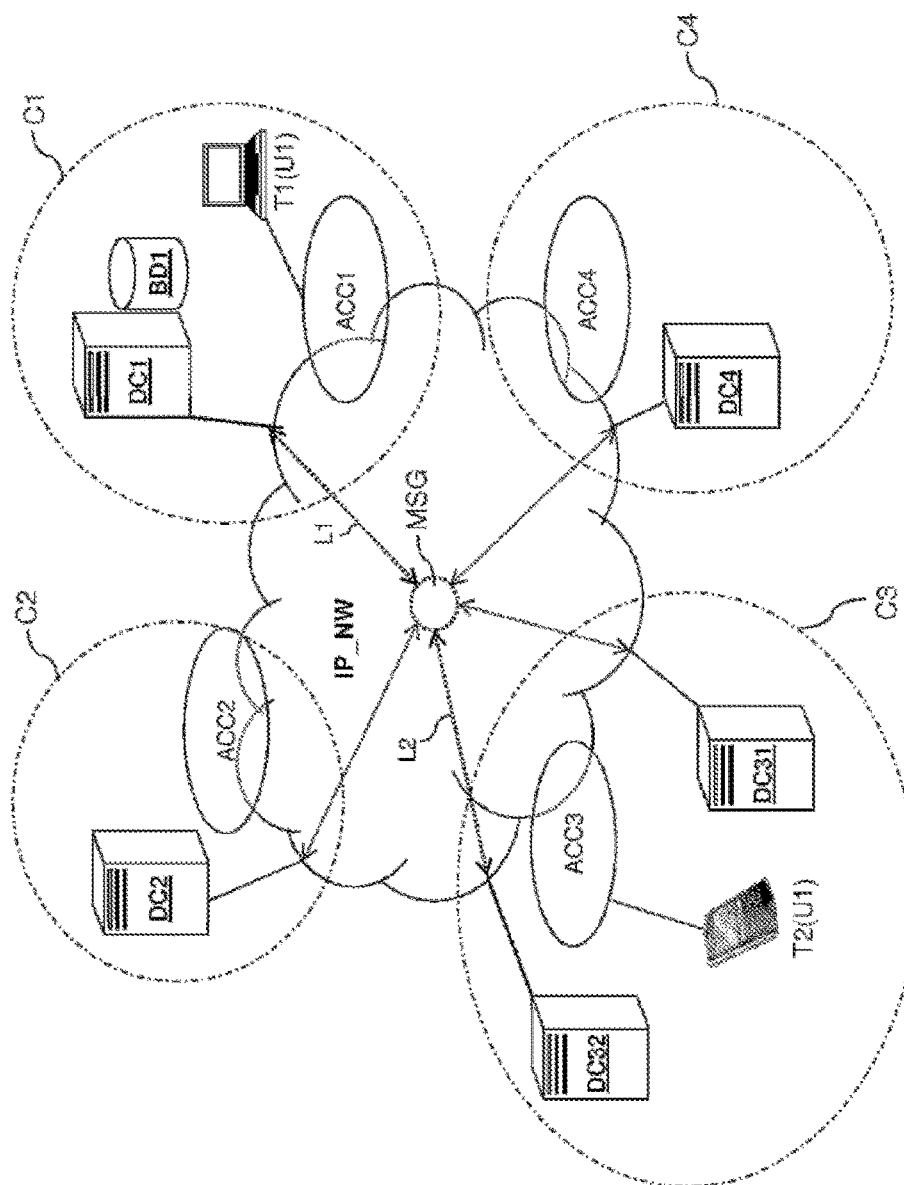
FIG. 1 is a diagram showing a cloud computing system according to the invention.

FIG. 1 shows a cloud computing system according to the invention. In this example, the cloud computing system managed by the same cloud service provider (CSP) comprises a set of data centers distributed over a set of different geographic areas—in this example, four countries: C1-C4.

Thus, in this example, country C1 (France, for example) has a data center DC1 (associated with a database BD1), and at least one access network ACC1 for accessing an extensive packet network IP_NW, of the IP (internet protocol) type, such as the Internet. Correspondingly, country C2 (Spain, for example) has a data center DC2 and at least one access network ACC2, and country C4 (Poland, for example) also has a data center DC4 and at least one access network ACC4. In this example, country C3 is a geographically larger country, for example the USA, and has two different data centers DC31, DC32, as well as at least one access network ACC3.

It should be noted that the packet network IP_NW may be a virtual private network (VPN) built on top of the Internet. This type of network (VPN) is particularly suitable, for reasons of computer security, for the case in which the users of the cloud computing system form part of a business.

Each access network may be a mobile telephone network of a mobile telephone operator of the country in question, a fixed telephone network of a local operator offering internet access of the ADSL (Asymmetric Digital Subscriber Line) type, or a private business network of the LAN (Local Area Network) or WLAN (Wireless LAN) type.

In each of the geographic areas, therefore, a user of a service connects by means of his communication terminal to the packet network IP_NW, via a specific access network. Thus, in the area C1, France for example, a user U1 uses his portable computer T1(U1) to connect to the access network ACC1, for example a business IP network (Intranet), and to the IP_NW network, to access his services to which he initially subscribed at the data center DC1. The same user U1, traveling in area C3 (United States), connects to the IP_NW network with his mobile telephone of the smartphone type T2(U1), via the access network ACC3, in this case a mobile network of a mobile telephone operator in the area C3 in question.

As shown in FIG. 1, the different data centers DCi are interconnected by a specific communications network MSG implemented on top of the extended IP network IP_NW. This network MSG allows signaling messages to be exchanged between the different data centers. Each data center thus comprises a communication module adapted to communicate on the IP_NW network with the other data centers of the cloud computing system, in order to determine in real time the state of activity and availability of the other data centers. For this purpose, each data center, such as the center DC1 in the area C1, is associated with a database (BD1 for the center DC1) in which, notably, the following information is stored:

The list of the data centers dedicated to the same cloud service provider, their state of activity and loading, and the computing resources available in each data center.

The list of the computer objects managed by each data center, namely resources, virtual machines, applications, and the like.

The list of users (persons or businesses) that have subscribed to a service provided by the cloud computing system, and also, for each user, the identification of the center where the user in question has made his initial subscription, that is to say the area where the subscribed service or services have their nominal performance, this center then being designated as the "data center of origin" for the user in question.

A history of the transfers of functionality that have taken place from one center to another for each user, a transfer of functionality being the sending, by a server of a data center to a server of another center, of a copy of some or all of the execution code of a virtual machine associated with a user, and of its execution context.

With regard to FIG. 2, a more detailed description will be given of the main steps of a method according to the invention for a user to access a communication service provided by a cloud computing system.

In order to explain the procedure of the access process according to the invention, the example of the user U1 mentioned above in relation to FIG. 1 will again be considered. This user has subscribed to communication services in his country of origin C1 (France), and his user account is therefore managed by the data center DC1 and his user identification data are recorded in the database BD1 associated with the center DC1. When traveling in country C3 (USA), the user U1 connects with his mobile terminal T2 (smartphone) to the IP_NW network (the internet in this example) via the access network ACC3 (mobile network), and uses a web browser installed in the terminal to open a web page of an access portal to services of the cloud computing service provider, this portal possibly being hosted directly in a server of the data center of origin DC1 or in an intermediate server on the internet (not shown).

Figure 2:
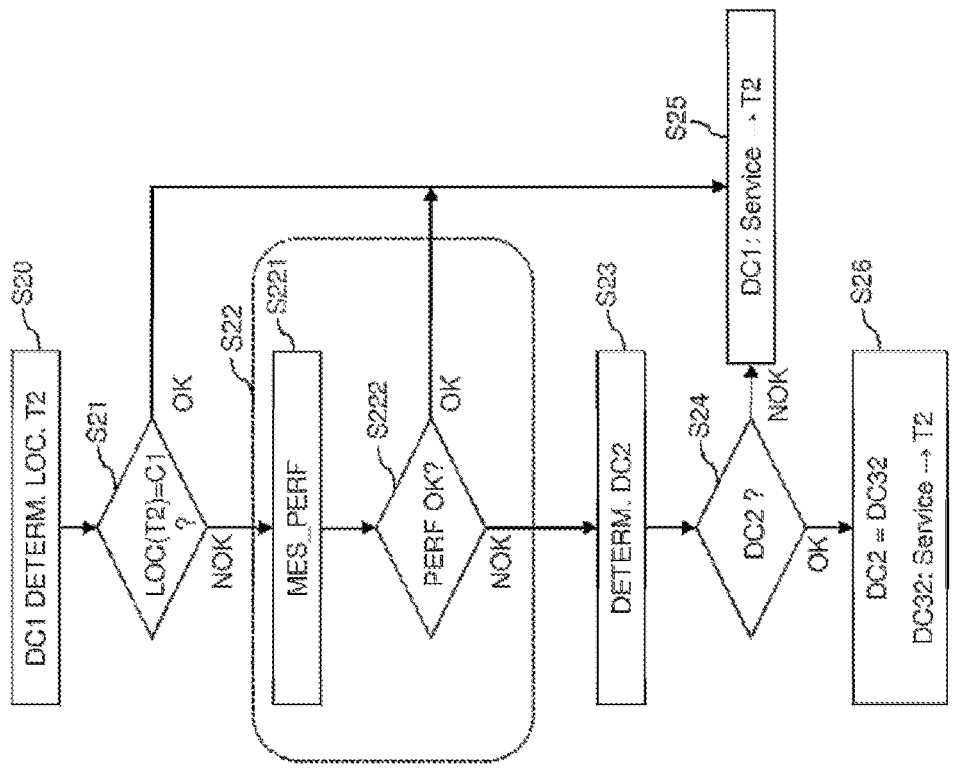
FIG. 2 is a flow diagram showing the main steps of a method according to the invention for a user to access a communication service provided by a cloud computing system.

As shown in FIG. 2, in step S20, after connection to the access portal to the cloud computing services, an information message about the location of the terminal T2 is transmitted to the reference data center for the user U1, that is to say DC1, in which an operation of determining the geographic location of the terminal T1 is then executed, on the basis of the received location information.

The geolocation of the user's terminal can be performed by an application installed in the terminal (a GPS location application, for example), or can be executed directly in the virtual machine managing this user's account in the data center DC1. For example, the application of the data center DC1 accessed by the terminal T2 can use a location tool based on the knowledge of the IP address of the terminal, such as the GeoIP™ geolocation tool produced by Max-Mind.

Following the determination of the geolocation of the terminal of the user U1, a test S21 is performed to determine whether the geographic location of the terminal of the user (U1) corresponds to the geographic area of origin (C1). If this is the case (OK), then in step S25 the service is provided in a conventional way from the data center of origin DC1 (this is the case in which the user U1 uses his terminal T2 in the area C1). However, if the location of the user's terminal T2 does not correspond to the area of origin (S21, NOK) but to a geographic area (C3, "second area") different from the area of origin (C1, "first area"), then, according to a first simplified variant embodiment of the method according to the invention, the method moves directly to step S23 of searching for a second data center of the cloud computing system, capable of providing the service in the identified second area (C3). According to a second more advanced and more efficient variant embodiment of the method, if the second area is different from the first area (S21, NOK), the method moves to a step S22 of measuring network performance between the first data center and the user's terminal, step S23 being executed only if the measured network performance is insufficient to meet a specified level of quality of service.

The aforesaid step S22 starts with an operation S221 of measuring network performance between the data center of origin (DS1) and the terminal (T2) of the user (U1) located in the area (C3) different from the area of origin (C1). According to an exemplary embodiment, this operation (S221) of measuring network performance includes the measurement of jitter between the data center of origin (DC1) and the user's terminal (T2), and the measurement of metrics specific to the type of service requested by the user. Regarding the jitter parameter, reference may be made to the IETF specification at the following web address: http://tools.ietf.org/html/rfc3393.

In practice, the measurement of the network performance is launched by an application executed in a server of the data center of origin, and uses the SNMP (Simple Network Management Protocol) protocol, which is a communications protocol enabling network administrators to manage the network equipment and to monitor and diagnose network and hardware problems remotely. The values measured by using the SNMP protocol are compared with reference values (also called "nominal" values) which vary according to the type of service requested by the user. For example, the required performance, notably in terms of data rate and response time, is greater for a videoconference service provided to multiple users than for simple audio communication or for the viewing of images stored in a personal space in the cloud.

According to a possible implementation, relating to a voice service, the performance measurement may also take into consideration a periodic calculation of an MOS (Mean Opinion Score), calculated objectively using a known method such as the PESQ (Perceptual Evaluation of Speech Quality) method.

When the performance has been measured (S221), it is compared (S222) with the nominal values required for the service in question; the nominal values are, for example, stored in the database (BD1) associated with the data center of origin (DC1). If the measured performance is sufficient (S222, OK), then the service is provided in a conventional way from the data center of origin DC1 (S25).

If this is not the case (S222, NOK), a search is made in the subsequent step S23 for a second data center of the cloud computing system capable of providing the requested service in the area in which the user's terminal (T2) is located. For this purpose, the application executed in the data center of origin (DC1) ("first center") consults the associated database (BD1) to determine—for example on the basis of a table of geographic locations of data centers in the area (C3) (called the "visited area") in which the user (T2(U1)) is located—a data center capable of providing the requested service in the visited area, based on, notably, the geographic proximity of the center in question to the terminal, the network load in the sector of this center, and the current workload of the center.

Thus, in the test step S24, if no data center is available (S24, NOK) in the visited area, then the service is provided in a conventional way from the data center of origin DC1 (S25). If this is not the case, that is to say if a data center of this type in the proximity of the user's terminal is found (S24, OK), then, in the next step S26, the computing functionality adapted to provide the communication service requested by the user is transferred from the data center of origin (DS1) to the second data center (DC32) identified, so that the communication service can be used in the user's terminal, based on this second center.

According to one embodiment, the user is notified, via a graphical interface displayed on his terminal, of whether or not the service functionality is being transferred from one data center to another. In this case, the user may be given a choice of launching or canceling the transfer of functionality.

For this purpose, the determination of a second data center located in the area where the user is located is followed by the sending of a message to the terminal, notifying a change of data center providing the service from the center of origin to the second data center; and then, subject to the user's validation of the transfer if appropriate, by the sending by the terminal of a service access request to the second data center.

Figure 3:
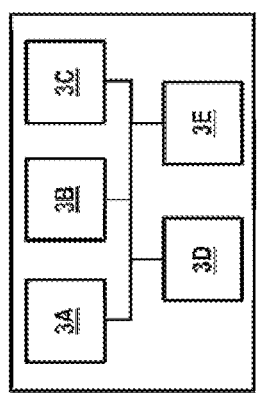
FIG. 3 shows the hardware architecture of a server of a data center according to the invention, capable of executing a method of access to a communication service according to the invention.

FIG. 3 shows the hardware architecture of a server of a data center capable of executing a method of access to a communication service according to the invention.

In the embodiment described here, the data center server has the hardware architecture of a computer; it comprises, notably, a processor 3A, a read-only memory (ROM) 3B, a random access memory (RAM) 3C, a non-volatile memory 3D (a hard disk, for example) and means 3E for communication with, notably, the other data centers distributed in the various geographic areas covered by the cloud computing service. These communication means 3E incorporate, in particular, a network card, which is known per se and is not detailed here.

The read-only memory 3B of the data center server forms a recording medium according to the invention, readable by the processor 3A, on which medium a computer program or software package according to the invention is recorded, comprising instructions for executing the steps of a method for a user to access a cloud computing service according to the invention, as described above with reference to FIG. 2.

This software package defines in a corresponding way the functional entities of the data center capable of executing these steps, in particular:
  a unit for receiving a location information message from a user terminal connected to a web portal for access to the cloud computing services;
  a unit for determining the geographic location of a user terminal on the basis of received location information;
  a unit for identifying a second data center capable of providing a service requested by a user terminal located in a geographic area different from that in which the data center is located; this identification unit comprising a communication module adapted to communicate on the packet network (IP_NW, FIG. 1) with the set of data centers of the cloud computing system, in order to determine in real time the state of activity of these data centers;
  a unit for transferring, to this second data center, the computing functionality capable of providing the communication service to a user terminal located in a geographic area different from that of the data center (the data center of origin), so that the communication service can be used in the terminal, based on the second data center.

Figure 4:
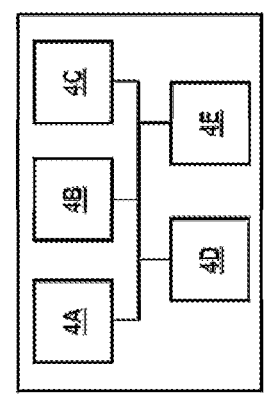
FIG. 4 shows the hardware architecture of a communication terminal according to the invention, adapted to execute a method of access to a communication service according to the invention.

FIG. 4 shows the hardware architecture of a communication terminal according to the invention, adapted to execute a method of access to a communication service as described above. This communication terminal may be, for example, a personal computer (fixed PC, portable computer, or digital tablet) or a mobile telephone of the smartphone type. It is therefore designed according to the hardware architecture of a computer, and comprises, notably, a processor 4A, a read-only memory (ROM) 4B, a random access memory (RAM) 4C, a non-volatile memory 4D (a hard disk, for example) and means 4E for communication with, notably, a server hosting an access portal to the services provided by the cloud computing system, and with the data centers distributed in the various geographic areas covered by the cloud computing service. These communication means 4E incorporate, in particular, a network card, which is known per se and is not detailed here.

The read-only memory 4B of the communication terminal forms a recording medium according to the invention, readable by the processor 4A, on which medium a computer program or software application according to the invention is recorded, comprising instructions for executing the steps of a method, according to the invention, for access to a cloud computing service, which are executed in the terminal. This program defines, in a corresponding way, functional modules of the terminal capable of executing these steps, in particular:
  a module for sending a location information message to a first data center after connection to a web portal for access to the service;
  a module for receiving a message notifying a change of data center providing the service, from the first to a second data center;
  a module for sending a request for access to the service to the second data center.

Figure 5:
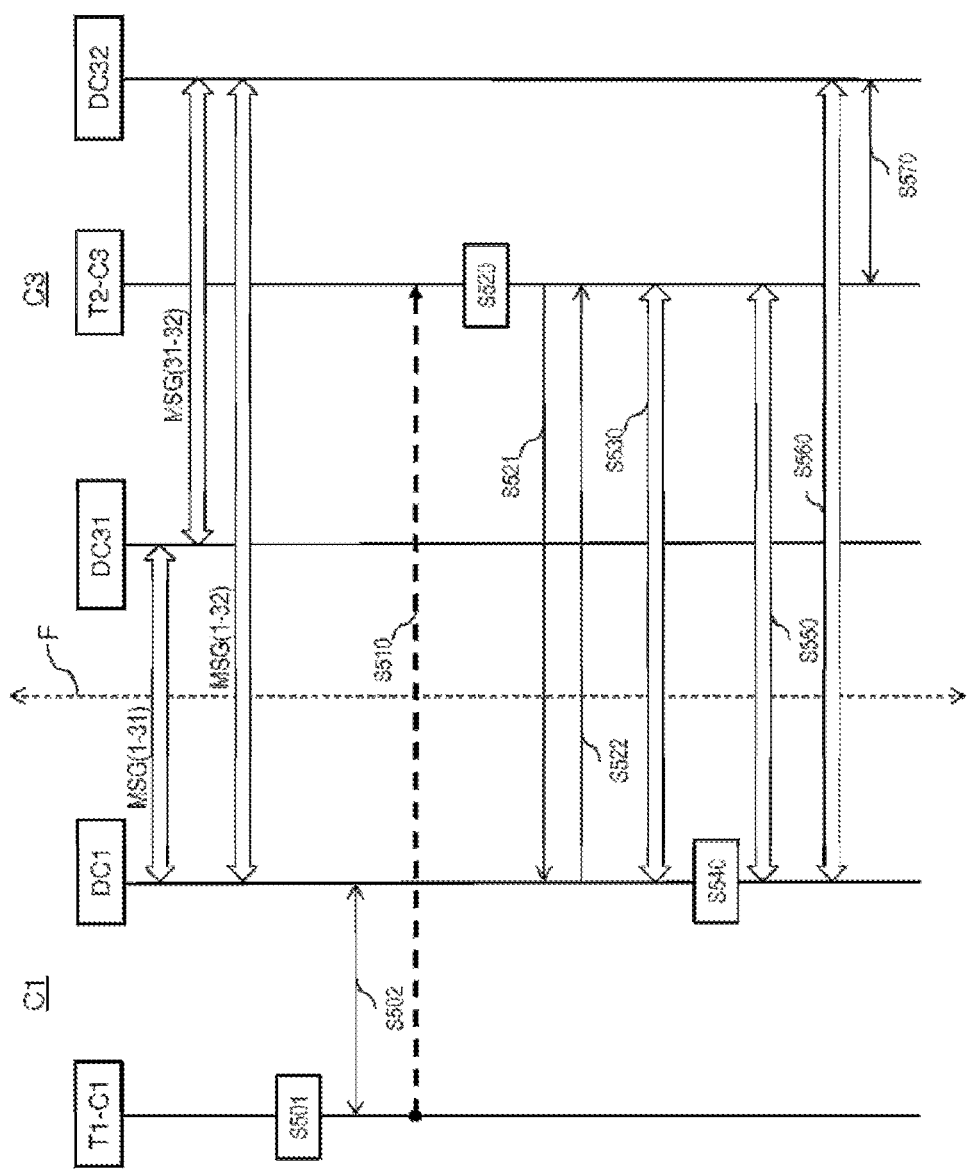
FIG. 5 shows, in the form of an exchange diagram, an example of execution of a method according to the invention for a user to access a communication service provided by a cloud computing system.

FIG. 5 shows, in the form of an exchange diagram, the execution of the method for access to a communication service according to the invention, in the exemplary cloud computing system described above in relation to FIGS. 1 and 2.

In the diagram shown here, the following entities of FIG. 1 are represented: the terminal T1 of the user U1, which is located initially in the area C1 (T1-C1), the data center DC1 of origin for the user U1 (the center managing the account of the user U1), the data centers DC31 and DC32 associated with the area C3 (the separation from the area C1 being indicated by the double arrow F), and the terminal T2 of the user U1 when the user is traveling in the area C3 (T2-C3).

In the exchange diagram, the double arrows denoted MSG(1-31), MSG(1-32), and MSG(31-32) represent signaling messages exchanged between the data centers (DC1, DC31, DC32) so that they can inform one another of their presence and activity. These messages use, in particular, the Alive and RespOK functions defined in the Appendix.

In practice, according to an example of implementation, the exchanges between the different data centers use a data format known by the abbreviation JSON (JavaScript Object Notation).

In the operation S501, the user U1 located in the area C1 (on the premises of his business, for example) connects via his terminal T1 (portable PC) to the access portal for the services to which he has subscribed; his terminal T1 being located in the area of origin C1, the requested services are directly provided by the data center DC1 (step S502).

Subsequently (arrow S510), the user makes a business trip from country C1 (France) to country C3 (USA), taking his mobile terminal T2 (smartphone). During the operation S520, the user connects with his mobile terminal (T2) to the access portal for the service platform.

During the exchange of messages S521 and S522, the terminal T2 transmits its location to the reference data center DC1 and receives an acknowledgement of receipt from the center DC1; this message exchange uses the functions SetNewLocation and RespOK defined in the Appendix.

The next message exchange, S530, corresponds to the measurement of network performance between the center of origin DC1 and the user terminal T2. This operation of performance measurement uses the functions GetJitter, GetMetrics and RespOK defined in the Appendix.

When the results of the performance measurement have been obtained, in the operation S540, the data center DC1 determines that these results are insufficient to provide the required quality of service, and seeks a data center in the area C3 where the terminal T2 is located. The center DC1 identifies the secondary center DC32 available in area C3, and informs the terminal T2 of this (exchange S550) by a notification message to which the terminal T2 responds favorably (either automatically or under the user's control). The exchange S550 uses the functions Notification and RespOK defined in the Appendix.

In the next exchange S560 which takes place between the data center DC1 of origin and the data center DC32 selected in the area C3 visited by the user, there is a transfer, from the center DC1 to the center DC32, of the service functionality required for the execution of the service requested by the user from the secondary center DC32. In FIG. 1, the transfer of functionality is illustrated by the double arrows in dotted lines L1 and L2.

The message exchange between the centers DC1 and DC32 for the aforesaid transfer of functionality (S560) uses the Select, Move, and RespOK functions defined in the Appendix.

Finally, on completion of the transfer of functionality to the data center DC32, the latter notifies this to the user's terminal T2, which confirms the correct reception of the information by a response message (exchange S570). The aforesaid exchange S570 uses the Notification and RespOK functions.

The user U1 can then execute the requested service with his terminal T2, benefiting from an optimal quality of service and minimized financial cost, since the service is provided by a data center of the cloud service provider, situated in the geographic area where the user is located.

Appendix

An example is given below of definitions of functions corresponding to commands transmitted in the messages exchanged between the different data centers of a cloud service provider, distributed over a set of different geographic areas.

The Alive function

```
{
  "Function name": "Alive",
  "parameter1": "From idDC"
}
```

Where idDC is a unique identifier of the center 'DC'
Action: enables the DC (data center) identified by idDC to indicate its presence in the inter-DC communications network. This message is sent in broadcast mode to all the centers DC.

The Select function

```
{
  "Function name": "Select",
  "parameter1": "idDC",
  "parameter2": "idObject"
}
```

Where idObject denotes a unique identifier for identifying a computer object: virtual machine (VM), application software, binary object, resource (CPU, memory, storage space).
Action: enables a particular computer object of an identified DC to be chosen/selected.

The Move function

```
{
  "Function name": "Move",
  "parameter1": "Object",
  "parameter2": "From idDC",
  "parameter3": "To idDC"
}
```

Action: enables an Object to be moved from a DC to another DC.

The Notification function

```
{
  "Function name": "Notification",
  "parameter1": "Type",
  "parameter2": "From idDC",
  "parameter3": "To idDC/idApp",
  "parameter4": "Object",
}
```

Where Type denotes a type of notification message to a user terminal application; idAPP denotes a unique identifier of the user equipment (for example: IP address).
Action: enables messages notifying an event relating to an Object to be sent between DCs, or from a DC to equipment of a terminal idAPP.

The GetJitter function

```
{
  "Function name": "GetJitter",
  "parameter1": "From idDC",
  "parameter2": "To idApp"
}
```

Action: enables the jitter to be measured in the packet transmission between a DC hosting a service and the user equipment connected to the service.

The GetLocation function

```
{
  "Function name": "GetLocation",
  "parameter1": "From idDC",
  "parameter2": "To idApp"
}
```

Action: enables retrieval of the location of the user equipment connecting to the service.

The Message function

```
{
  "Function name": "Message",
  "parameter1": "TheMessage",
  "parameter2": "From idDC/idApp",
  "parameter3": "To idDC/idApp",
  "parameter4": "Object",
}
```

Action: enables a message 'TheMessage' to be sent from a DC to another DC, or from a DC to a user application.

The GetMetrics function

{

-continued

```
"Function name": "GetMetrics",
"parameter 1": "From idDC",
"parameter 2": "To idApp",
"parameter 3": "Object",
"parameter4": "[Stat1, Stat2, StatN]"
}
```

Where Stati is a required type of metric (MOS, percentage of packet loss, metric specific to the type of service, etc.).

Action: enables the metrics relating to a communication service requested by a user to be retrieved.

The RespOK function

```
{
"Function name": "RespOK",
"parameter1": "From idDC/idApp",
"parameter2": "To idDC /idApp",
}
```

Action: enables the transmitter (DC or user equipment) to be informed that a message has been correctly received.

The SetNewLocation function

```
{
"Function name": "SetNewLocation",
"parameter1": "From idApp",
"parameter2": "to idDC",
"parameter3": "theLocation"
}
```

Where theLocation is the location of the user equipment.

Action: enables a user terminal to transmit its location to a DC.

Although the present disclosure has been described with reference to one or more examples, workers skilled in the art will recognize that changes may be made in form and detail without departing from the scope of the disclosure and/or the appended claims.

The invention claimed is:

1. A method for a user to access at least one communication service provided via a first data center of a cloud computing system, the first data center being located in a first geographic area, the method comprising the following acts, executed in the first data center:
   a) after a user's terminal has been connected to a web portal for accessing said service, receiving in the first data center a message providing information on the location of the terminal;
   b) determining the geographic location of the terminal on the basis of the received terminal location information, and if the geographic location of the terminal corresponds to a second geographic area, different from the first area, then:
   d) searching for a second data center of the cloud computing system capable of providing the service in the second area;
   e) if this second data center exists, transferring computing functionality adapted to provide the communication service to the user to the second data center, so that the communication service can be used in the user's terminal, based on the second data center wherein said computing functionality adapted to the provision of the service is implemented in a virtual machine hosted by a server of the first data center, and wherein, in act e), the transfer of said functionality from the first data center to the second data center corresponds to sending, to a server of the second data center, of a copy of some or all of the execution code of said virtual machine and its execution context.

2. The method as claimed in claim 1, wherein act d) is preceded by a act c) of measuring network performance between the first data center and the user's terminal, act d) being executed only if the measured network performance is insufficient to meet a specified level of quality of service.

3. The method as claimed in claim 2, wherein act c) of measuring the network performance includes measurement of jitter between the first data center and the terminal, and measurement of metrics specific to a type of the service requested by the user.

4. The method as claimed in claim 1, wherein, in act e), the use of the service in the user's terminal comprises:
   sending a message to the terminal, notifying a change in service provider data center from the first to the second data center;
   sending by the terminal of a request for access to said service to the second data center.

5. The method as claimed in claim 1, wherein a geographic area is a territory and/or a country, each geographic area being associated with at least one data center of the cloud computing system, thus forming a set of data centers interconnected by a packet network.

6. The method as claimed in claim 5, wherein the cloud computing system is carried out by a same cloud service provider, a user terminal being connected, in each geographic area, to the packet network via a different access network.

7. The method as claimed in claim 6, wherein the packet network is a virtual private network built on top of the Internet.

8. The method as claimed in claim 6, wherein an access network of a geographic area belongs to the group consisting of, a private local network, a mobile network of a mobile telephone operator, and an ADSL network provided by a telephone operator.

9. A first data center of a cloud computing system for execution of a method of access to a communication service, comprising:
   a processor; and
   a non-transitory computer-readable medium comprising instructions stored thereon, which are executable by the processor, the instructions comprising:
   a unit that configures the processor to receive a location information message from a user terminal connected to a web portal for access to said service;
   a unit that configures the processor to determine the geographic location of the user terminal on the basis of received location information;
   a unit that configures the processor to identify a second data center capable of providing a service requested by the user terminal located in a geographic area different from that in which said first data center is located;
   a unit that configures the processor to transfer, to this second data center, computing functionality adapted to provide the communication service to the user terminal located in the geographic area different from that of said first data center, so that the communication service can be used in said terminal, based on the second data center;

wherein said computing functionality adapted to the provision of the service is implemented in a virtual machine hosted by a server of the first data center, and wherein the transfer of said functionality from the first data center to the second data center corresponds to sending, to a server of the second data center, of a copy of some or all of the execution code of said virtual machine and its execution context.

10. The data center as claimed in claim 9, wherein said unit identifying a second data center comprises:
a communication module adapted to communicate on the packet network with a set of data centers of the cloud computing system, in order to determine in real time the state of activity of said data centers.

11. A communication terminal for execution of a method for access to a communication service, comprising:
a processor; and
a non-transitory computer-readable medium comprising instructions stored thereon, which are executable by the processor, wherein when executed by the processor the instructions configure the communication terminal to perform acts comprising:
sending a location information message to a first data center after connection to a web portal for access to said service;
receiving a message notifying a change of data center providing the service, from the first to a second data center, said received message, notifying a change of data center providing the service, corresponding to a transfer, to the second data center, of computing functionality adapted to provide the communication service to the communication terminal, so that the communication service can be used in said communication terminal, based on the second data center, and wherein said computing functionality adapted to the provision of the service is implemented in a virtual machine hosted by a server of the first data center, and wherein the transfer of said functionality from the first data center to the second data center corresponds to sending, to a server of the second data center, of a copy of some or all of the execution code of said virtual machine and its execution context;
sending a request for access to said service to the second data center.

12. A non-transitory computer-readable medium comprising a computer program stored thereon for executing a method for a user to access at least one communication service provided via a first data center of a cloud computing system, when the program is executed by a processor in the first data center, the first data center being located in a first geographic area, the computer program configuring the first data center to perform the following acts:
a) after a user's terminal has been connected to a web portal for accessing said service, receiving a message providing information on the location of the terminal;
b) determining the geographic location of the terminal on the basis of the received terminal location information, and if the geographic location of the terminal corresponds to a second geographic area, different from the first area, then:
d) searching for a second data center of the cloud computing system capable of providing the service in the second area;
e) if this second data center exists, transferring computing functionality adapted to provide the communication service to the user to the second data center, so that the communication service can be used in the user's terminal, based on the second data center;
wherein said computing functionality adapted to the provision of the service is implemented in a virtual machine hosted by a server of the first data center, and wherein, in act e), the transfer of said functionality from the first data center to the second data center corresponds to sending, to a server of the second data center, of a copy of some or all of the execution code of said virtual machine and its execution context.

* * * * *